United States Patent
Bergstrom et al.

(10) Patent No.: US 8,453,104 B2
(45) Date of Patent: May 28, 2013

(54) THIN CLIENT SOFTWARE DEVELOPMENT ENVIRONMENT

(75) Inventors: Lars A. Bergstrom, Chicago, IL (US); Vijaye G. Raji, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1668 days.

(21) Appl. No.: 11/588,745

(22) Filed: Oct. 27, 2006

(65) Prior Publication Data

US 2008/0127135 A1    May 29, 2008

(51) Int. Cl.
G06F 9/44    (2006.01)

(52) U.S. Cl.
USPC ............ 717/100; 717/106; 717/109; 717/110

(58) Field of Classification Search
None
See application file for complete search history.

(56) References Cited

U.S. PATENT DOCUMENTS

| | | | | |
|---|---|---|---|---|
| 6,158,044 A * | 12/2000 | Tibbetts | ............... | 717/100 |
| 6,944,860 B2 * | 9/2005 | Schmidt | ............... | 718/100 |
| 7,000,220 B1 | 2/2006 | Booth | | |
| 7,075,544 B2 | 7/2006 | Kim et al. | | |
| 7,213,228 B2 * | 5/2007 | Putterman et al. | ............ | 717/109 |
| 7,546,576 B2 * | 6/2009 | Egli | ............... | 717/106 |
| 7,861,213 B2 * | 12/2010 | Wang | ............... | 717/100 |
| 8,239,824 B2 * | 8/2012 | Cifra et al. | ............ | 717/109 |
| 2002/0040434 A1 | 4/2002 | Elliston et al. | | |
| 2002/0078255 A1 | 6/2002 | Narayan | | |
| 2003/0014442 A1 * | 1/2003 | Shiigi et al. | ............ | 707/513 |
| 2003/0046557 A1 | 3/2003 | Miller et al. | | |
| 2003/0065715 A1 | 4/2003 | Burdick, Jr. et al. | | |
| 2004/0003091 A1 * | 1/2004 | Coulthard et al. | ............ | 709/227 |
| 2005/0015675 A1 * | 1/2005 | Kolawa et al. | ............ | 714/38 |
| 2005/0021756 A1 | 1/2005 | Grant | | |
| 2005/0055665 A1 | 3/2005 | Woo et al. | | |
| 2005/0102377 A1 | 5/2005 | King et al. | | |
| 2005/0108023 A1 | 5/2005 | Hemmings | | |
| 2005/0114769 A1 * | 5/2005 | Arkhipov et al. | ............ | 715/531 |
| 2005/0197157 A1 | 9/2005 | Li et al. | | |

(Continued)

FOREIGN PATENT DOCUMENTS

| | | |
|---|---|---|
| JP | J1310-214181 | 8/1998 |
| JP | 2008-533549 | 8/2008 |
| WO | WO0175610 A1 | 10/2001 |
| WO | WO2006072964 A2 | 7/2006 |

OTHER PUBLICATIONS

Lok et al., A graphical user interface toolkit approach to thin-client computing, May 2002, 8 pages, <http://delivery.acm.org/10.1145/520000/511540/p718-lok.pdf>.*

(Continued)

*Primary Examiner* — Thuy Dao

(57) ABSTRACT

Various technologies and techniques are disclosed for providing a thin client software development environment. A server-based software development application is provided that is operable to be displayed in a thin client user interface on a client computer. The server-based development application has a server-based compiler. Input is received from the client computer to interact with a software development project using the server-based software development application. The software development project is stored in a location accessible from the software development application. A compile selection is received from the client computer to compile the software development project using the server-based software development application. A compiled application is generated with the server-based software development application and provided to the client computer. A sharing feature allows the software development project to be accessed by multiple users from different client computers.

19 Claims, 7 Drawing Sheets

U.S. PATENT DOCUMENTS

| | | | |
|---|---|---|---|
| 2006/0168512 A1 | 7/2006 | Wilson et al. | |
| 2006/0184614 A1 | 8/2006 | Baratto et al. | |
| 2006/0236301 A1* | 10/2006 | Minium et al. | 717/101 |
| 2006/0248517 A1* | 11/2006 | Bartsch et al. | 717/140 |
| 2007/0168909 A1* | 7/2007 | Vaidyanathan et al. | 717/100 |
| 2008/0016488 A1* | 1/2008 | Adams et al. | 717/100 |
| 2008/0127217 A1* | 5/2008 | Wang | 719/318 |
| 2009/0125880 A1* | 5/2009 | Manolescu et al. | 717/110 |

OTHER PUBLICATIONS

Cao et al., An Architecture for Generating Web-Based, Thin-Client Diagramming Tools, Sep. 2004, 4 pages, <http://delivery.acm.org/10.1145/1030000/1025225/21310270.pdf>.*

"International Search Report", Mailed Jan. 25, 2008, Application No. PCT/US2007/080546, Filed Date Oct. 5, 2007, pp. 1-11.

"EP Search Report", Mailed Oct. 21, 2009, Application No. PCT/US2007/080546, EP Application No. EP 07843890, pp. 1-10.

Brown, Alan W., "CASE in the 21st Century: Challenges Facing Existing CASE Vendors", Software Technology and Engineering Practice, Proceedings of Eighth IEEE International Workshop on Incorporating Computer Aided Software Re-Engineering, Jul. 14, 2007, pp. 268-278.

Canfora, et al., "Developing Java-AWT thin-client applications for limited devices," Date: Sep. 2005-Oct. 2005, p. 55-63, Publisher: IEEE Computer Society, http://ieeexplore.ieee.org/search/srchabstract.isp?.

Claterbos, "Developing Advanced Thin Client Applications with Bi Beans," Date: 2004, http://www.vlamis.com/Papers/ioug2004-paper2.pdf.

Lai, et al., "Improving Web Browsing on Wireless PDAs Using Thin-Client Computing," Date: May 17, 2004-May 22, 2004, http://www.ncl.cs.columbia.edu/publications/www2004 fordist.pdf.

Yang, et al., "Web Browsing Performance of Wireless Thin-Client Computing," Date: May 20, 2003-May 24, 2003, http://www2003.org/cdrom/papers/refereed/p741/p741-yang.htm.

Response to EP Office Action, Application No. 07843890.0, dated Jun. 18, 2010, 17 pages.

Response to Chinese Office Action, Application No. 200780040104.3, dated Jun. 12, 2010, 15 pages.

European Office Action, Application No. 07843890.0, dated Feb. 10, 2010, 7 pages.

Chinese First Office Action, Application No. 200780040104.3, dated Mar. 25, 2010, 8 pages.

Chinese Notice of Allowance, Application No. 200780040104.3, dated Jul. 15, 2010, 4 pages.

Russian Patent Application No. 2009/011562/08, Response to Office Action dated May 21, 2012, 14 pages (including English translation of amended claims).

Russian Patent Application No. 2009/011562/08, Office Action mailed Feb. 7, 2012, 4 pages.

Japanese Patent Application No. 2009-534749, Office Action dated Aug. 3, 2012, 4 pages.

Japanese Patent Application No. 2009-534749, Office Action dated Aug. 3, 2012, 4 pages. (English Translation).

Russian Patent Application No. 2009/011562, Response to Office Action filed Nov. 23, 2011, 13 pages (including English translation of amended claims).

Russian Patent Application No. 2009/011562, Office Action mailed Sep. 23, 2011, 7 pages.

Japanese Patent Application No. 2009-534749, Amendment dated Nov. 5, 2012, 11 pages (including English Translation of claims).

Japanese Patent Application No. 2009-534749, Office Action dated Nov. 30, 2012, 9 pages (including English Translation).

Hideaki Yanagisawa, "Web-based Collaborative Processors Development Environment," FIT2006, The Fifth Forum on Information Technology, Proceedings of General Conference, Four separate volumes of Network Computing, Architecture/Ubiquitous/Security, Education/Humanities, and Information System, Aug. 21, 2006, 5 pages.

* cited by examiner

THIN CLIENT SOFTWARE DEVELOPMENT ENVIRONMENT

BACKGROUND

The software development environments of today, such as MICROSOFT® Visual Studio, Eclipse, etc., are based on a thick client principle. In such environments, it is common to have multi-gigabyte software installations that can take hours to install before the development environment becomes usable. The machine where the software development application is installed must have enough resources to handle compilations, which can often require large amounts of RAM and other system resources. This puts a heavy burden on the local development machine.

Furthermore, users of such software development environments are not able to share their work easily with friends and/or colleagues without using some third party code sharing mechanism, such as by emailing a project to the person or using a version control system that manages the source code. One problem with emailing the project is that there can often be massive amounts of source code files involved, and the recipient of the email must have the software development application installed on their computer too. One problem with version control systems is that they are often limited to thick client installations as well, and can typically only be accessed by colleagues of a same particular company because of company security restrictions.

SUMMARY

Various technologies and techniques are disclosed for providing a thin client software development environment. A server-based software development application is provided that is operable to be displayed in a thin client user interface on a client computer. The server-based development application has a server-based compiler, which handles the compilation task that can often be resource intensive. Input is received from the client computer to interact with a software development project using the server-based software development application. The software development project is stored in a location accessible from the software development application. A compile selection is received from the client computer to compile the software development project using the server-based software development application. In response to the compile selection from the client computer, a compiled application is generated with the server-based software development application and provided to the client computer, such as using a file download feature.

In one implementation, various development features are provided to users in the thin client user interface, such as command completion, syntax coloring, and parameter help, to name a few non-limiting examples. In yet another implementation, a sharing feature allows the software development project to be accessed by multiple users from different client computers, such as to review, revise and/or comment on the project. One or more security settings can control access to the project by one or more users. In one implementation, the user that creates the project controls who can access the project.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
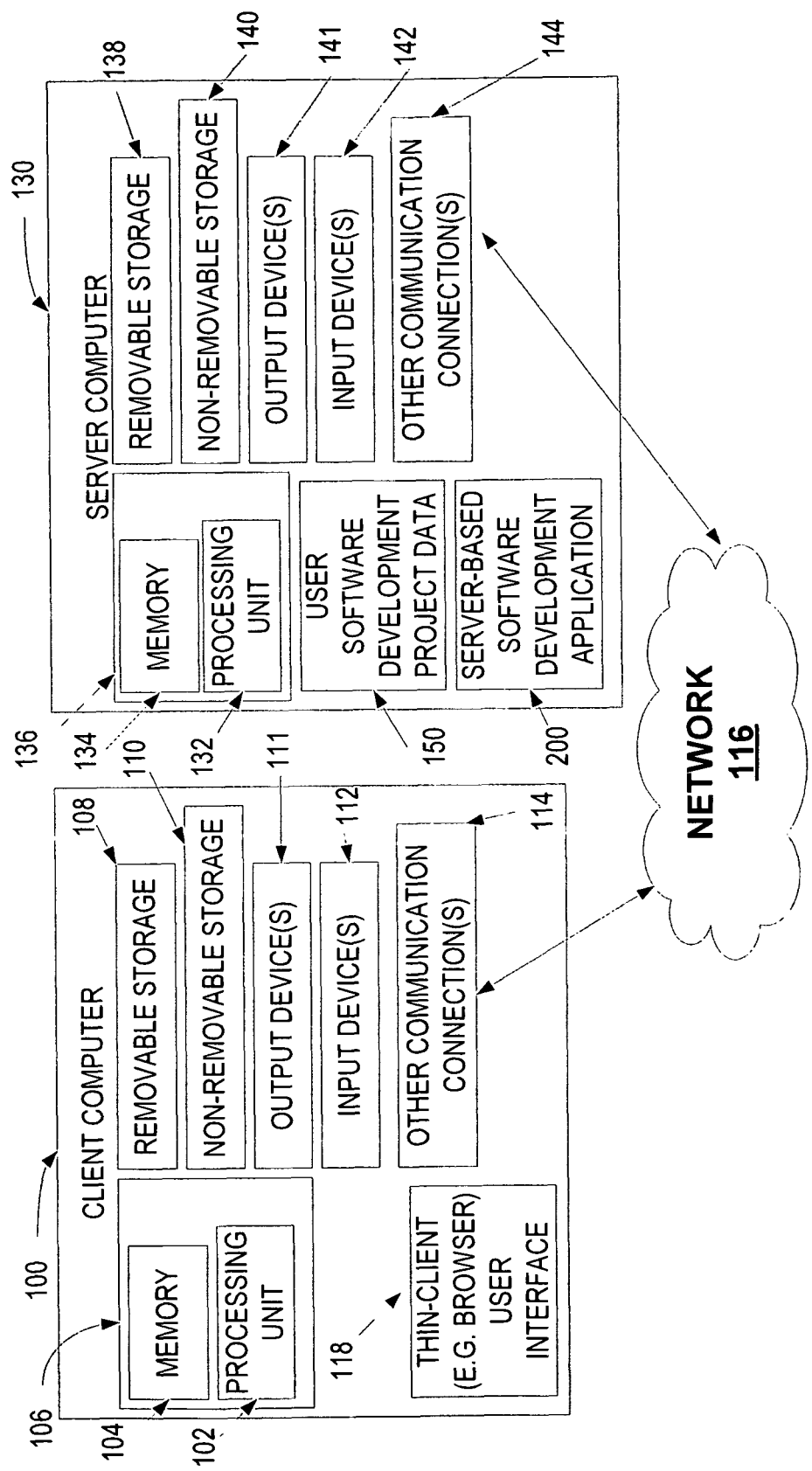
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software development application, but the system also serves other purposes in addition to these. In one implementation, one or more of the techniques described herein can be implemented as features within a software development program such as MICROSOFT® Visual Studio, Eclipse, or from any other type of program or service that allows a user to create software for one or more operating system platforms. In one implementation, a server-based software development application is provided that is accessible by a user in a thin client user interface. A server-based compiler performs the compilation and other resource intensive tasks, so the user's computer does not have to. Software development project files of one particular user can optionally be shared among multiple users.

As shown in FIG. 1, an exemplary computer system to use for implementing one or more parts of the system includes one or more computing devices, such as computing devices 100 and/or 130. In its most basic configuration, computing devices 100 and/or 130 typically include at least one processing unit (102 and 132, respectively) and memory (104 and 134, respectively). Depending on the exact configuration and type of computing device, memory 104 or 134 may be volatile (such as RAM), non-volatile (such as ROM, flash memory, etc.) or some combination of the two. This most basic configuration is illustrated in FIG. 1 by lines 106 and 136.

Additionally, devices 100 and/or 130 may also have additional features/functionality. For example, devices 100 and/or 130 may also include additional storage (removable and/or non-removable) including, but not limited to, magnetic or optical disks or tape. Such additional storage is illustrated in FIG. 1 by removable storage (108 and 138, respectively) and non-removable storage (110 and 140, respectively). Computer storage media includes volatile and nonvolatile, removable and non-removable media implemented in any method or technology for storage of information such as computer readable instructions, data structures, program modules or other data. Memory 104 and 134, removable storage 108 and 138, and non-removable storage 110 and 140 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100 and/or 130. Any such computer storage media may be part of device 100 and/or 130.

Computing devices 100 and/or 130 include one or more communication connections that allow computing devices 100 and/or 130 to communicate with each other and/or one or more other computing devices (150, 160, and 170, respectively) over network 116. Communications connection(s) 114 and 144 are examples of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one implementation, computing device 100 is a client computer that communicates with server computer 130 using communication connection 114 and 144 over network 116. In such an implementation, thin client (e.g. browser) user interface 118 of client computing device 100 accesses user software development project data 150 (if any), and server-based software development application 200 on server computing device 130 for performing one or more software development tasks. It will be appreciated that user software development project data 150 and/or server-based software development application 200 can be stored on the same computer or different computers, but that they are shown on the same server computing device 130 for the sake of clarity. In one implementation, thin client user interface 118 of client computing device 100 is a browser-based user interface, and server computing device 130 is a web server.

Computing devices 100 and 130 may also have input device(s) (114 and 134, respectively) such as keyboard, mouse, pen, voice input device, touch input device, etc. Output device(s) (116 and 136, respectively) such as a display, speakers, printer, etc. may also be included. These devices are well known in the art and need not be discussed at length here.

Figure 2:
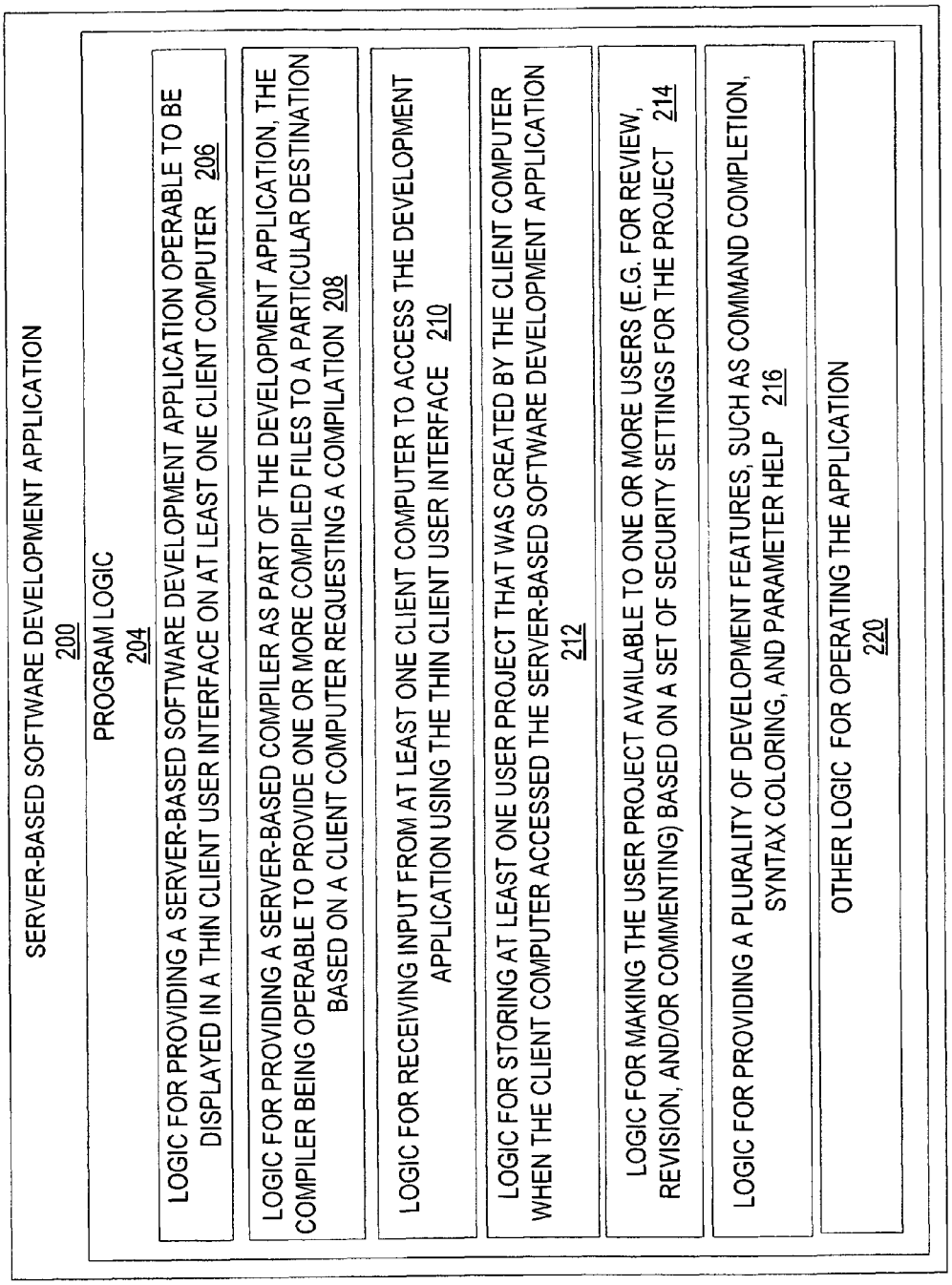
FIG. 2 is a diagrammatic view of a server-based software development application of one implementation operating on the computer system of FIG. 1.

Turning now to FIG. 2 with continued reference to FIG. 1, a server-based software development application 200 operating on computing device 100 is illustrated. Server-based software development application 200 is one of the application programs that reside on computing device 100. However, it will be understood that server-based software development application 200 can alternatively or additionally be embodied as computer-executable instructions on one or more computers and/or in different variations than shown on FIG. 1. Alternatively or additionally, one or more parts of server-based software development application 200 can be part of system memory 104, on other computers and/or applications 115, or other such variations as would occur to one in the computer software art.

Server-based software development application 200 includes program logic 204, which is responsible for carrying out some or all of the techniques described herein. Program logic 204 includes logic for providing a server-based software development application operable to be displayed in a thin client user interface on at least one client computer 206; logic for providing a server-based compiler as part of the development application, the compiler being operable to provide one or more compiled files to a particular destination based on a client computer requesting a compilation 208; logic for receiving input from at least one client computer to access the development application using the thin client user interface 210; logic for storing at least one user project that was created by the client computer when the client computer accessed the server-based software development application 212; logic for making the user project available to one or more users (e.g. for review, revision, and/or commenting) based on a set of security settings for the project 214; logic for providing a plurality of development features, such as command completion, syntax coloring, and parameter help 216; and other logic for operating the application 220.

Figure 3:
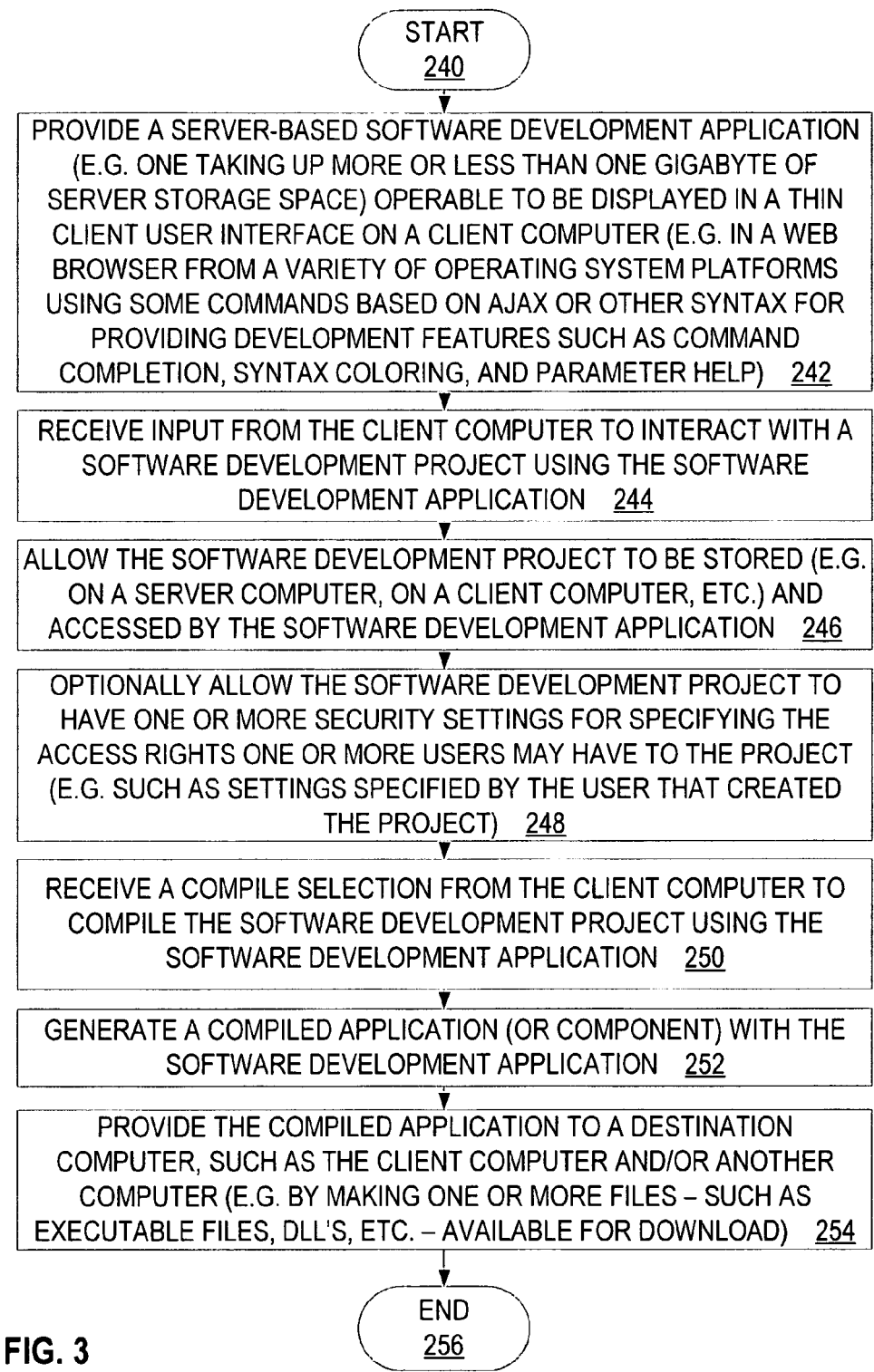
FIG. 3 is a process flow diagram for one implementation of the system of FIG. 1 illustrating the stages involved in providing a server-based software development application that can be accessed in a thin client user interface.
Figure 4:
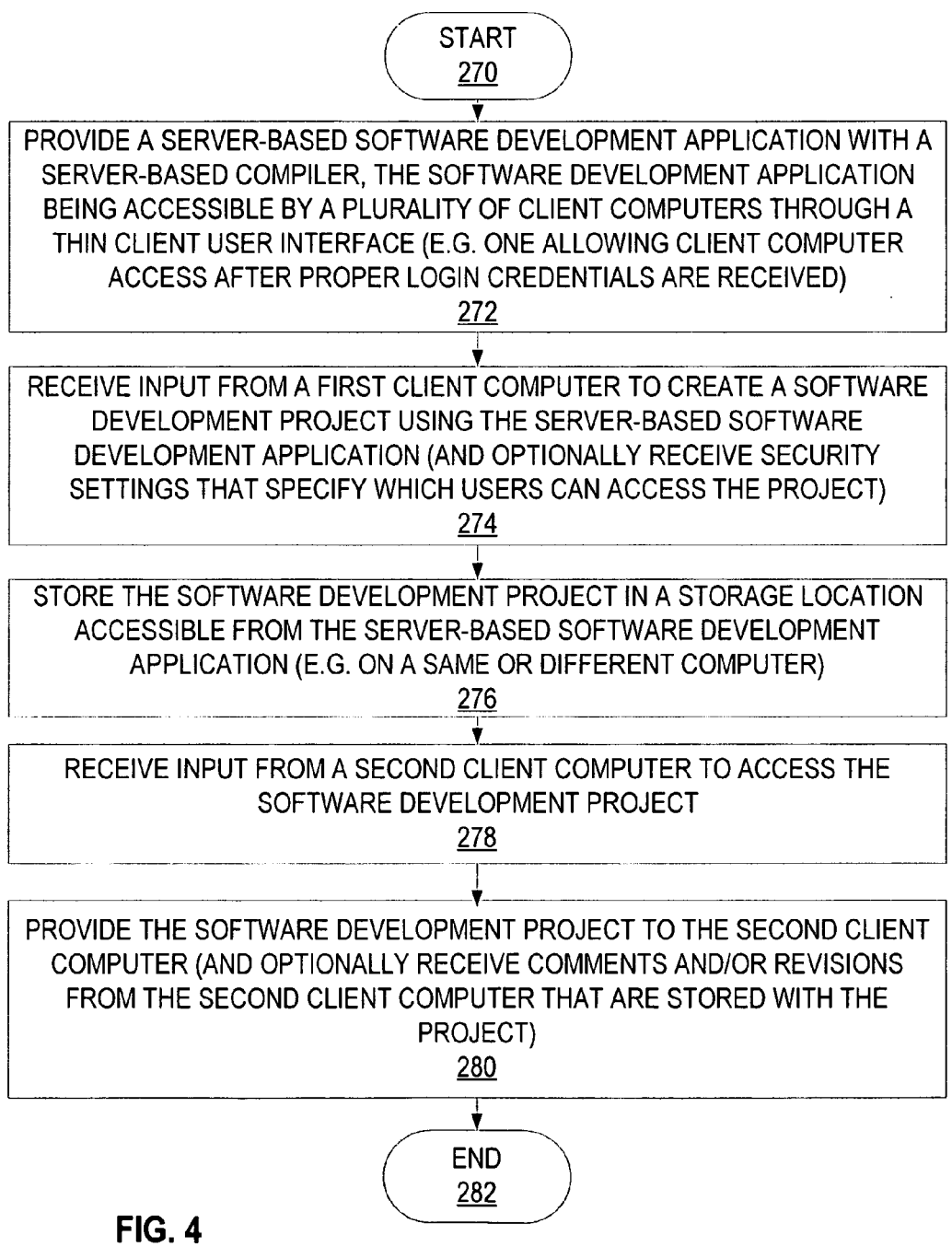
FIG. 4 is a process flow diagram for one implementation of the system of FIG. 1 illustrating the stages involved in using a thin client software development project sharing feature.

Turning now to FIGS. 3-4 with continued reference to FIGS. 1-2, the stages for implementing one or more implementations of server-based software development application 200 are described in further detail. FIG. 3 is a process flow diagram illustrating the stages involved in providing a server-based software development application 200 that can be accessed in a thin client user interface. In one form, the process of FIG. 3 is at least partially implemented in the operating logic of computing device 100. The procedure begins at start point 240 with providing a server-based software development application operable to be displayed in a thin client user interface on a client computer (stage 242). In one implementation, thin client user interface is accessible in a web browser from a variety of operating system platforms that uses some commands based on an Asynchronous JavaScript and XML (AJAX) or another technology (stage 242). In one implementation, development features such as command completion, syntax coloring, and parameter help are provided, to name a few non-limiting examples (stage 242). Alternatively or additionally, one or more web components are first downloaded from the server-based development application to the particular client computer before the thin client user interface will function properly. Server-based software development application can take up more or less than one gigabyte of server storage space (stage 242).

Input is received from the client computer to interact with a software development project using the software development application (stage 244). The software development project is stored (e.g. on a server computer, on a client computer, etc.) and accessible by the software development application (stage 246). The software development project can optionally have one or more security settings for specifying what access rights one or more users may have to the project (stage 248), such as read-only, read-write, copy-protected, etc. In one implementation, the user that created the project can modify the security settings controlling the access rights (stage 248). Alternatively or additionally, other users (such as project managers or network administrators) could be granted permission to modify the security settings for one or more projects.

A compile selection is received from the client computer to compile the software development project using the software development application (stage 250). A compiled application (or one or more components) is generated with the software development application by a server-based compiler (stage 252). The term "compile" as used herein is defined as the translation of source code into an executable format, such as an executable (EXE) file, dynamic link library (DLL), control, plug-in, etc. The compiled application is provided to a destination computer (such as the client computer or another computer), such as by making one or more files (executable files, DLL's, plug-ins, controls, etc.) available for download (stage 254). Alternatively or additionally, files generated by the compiler can be deployed automatically by the server, such as when web-part or web-application extension development is involved, to name a non-limiting example. Other file download and/or file deployment scenarios for the compiled one or more files are also possible, as would occur to one of ordinary skill in the software art. The process ends at end point 256.

FIG. 4 illustrates one implementation of the stages involved in using a thin client software development project sharing feature. In one form, the process of FIG. 4 is at least partially implemented in the operating logic of computing device 100. The procedure begins at start point 270 with providing a server-based software development application with a server-based compiler (stage 272). The software development application is accessible by a plurality of client computers through a thin client user interface (such as one allowing client computer access after proper login credentials are received) (stage 272). Input is received from a first client computer to create a software development project using the server-based software development application (and optionally, security settings are received that specify which users can access the project) (stage 274). The software development project is stored in a storage location that is accessible from the server-based software development application (e.g. on a same or different computer) (stage 276). Input is received from a second client computer to access the software development project (stage 278). The software development project is provided to the second client computer (stage 280). The software development application optionally receives comments and/or revisions from the second client computer that are stored with the project (stage 280). The process ends at end point 282.

Figure 5:
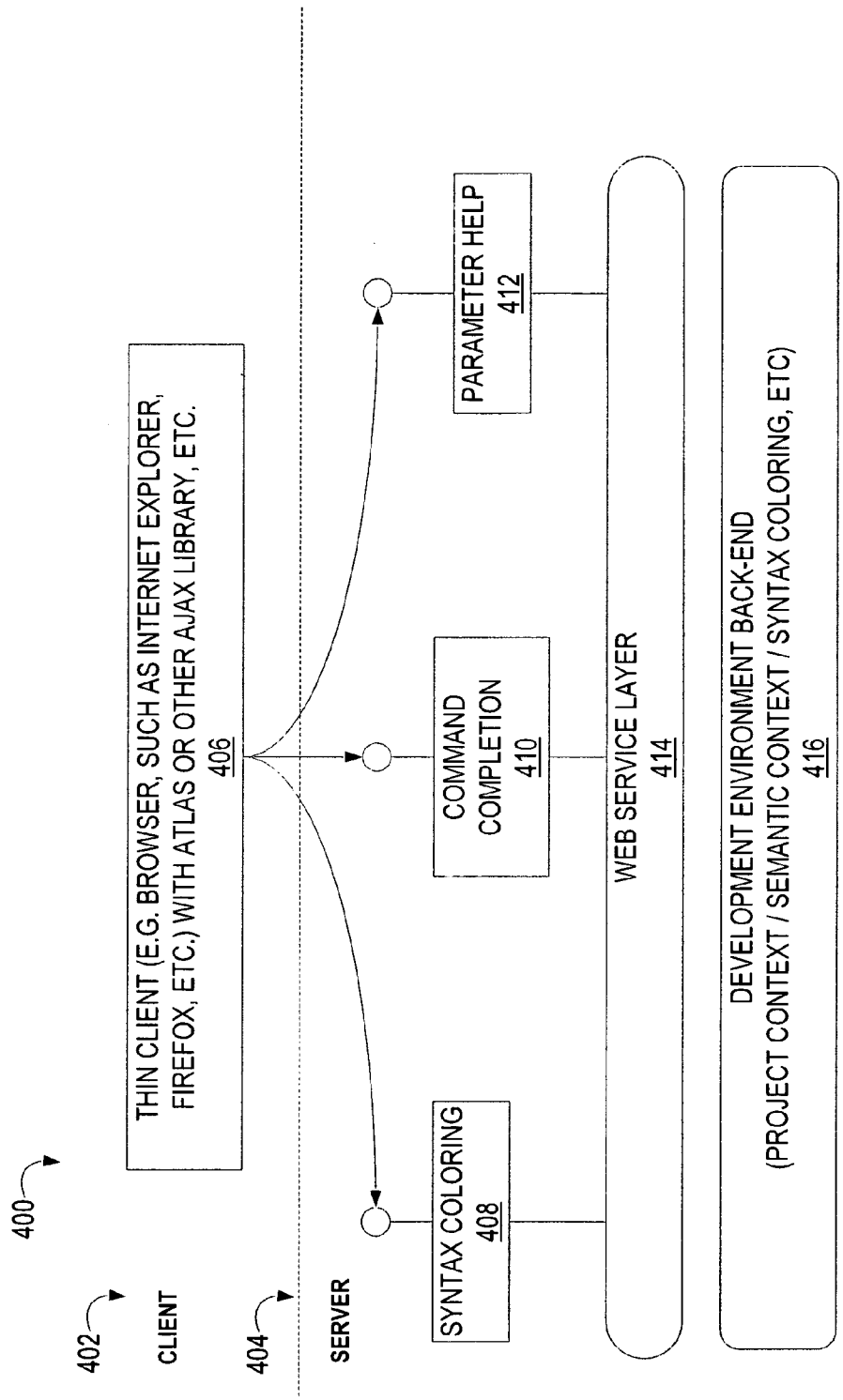
FIG. 5 is a logical diagram for one implementation of the system of FIG. 1 illustrating the components involved in providing a server-based software development application that is accessible in a thin client user interface.

FIG. 5 is a logical diagram for one implementation of the system of FIG. 1 illustrating the components involved in providing a server-based software development application 400 (200 on FIGS. 1 and 2) that is accessible in a thin client user interface. Client components 402 and server components 404 are shown. Client components include the thin client user interface 406, such as those in a browser, such as MICROSOFT® Internet Explorer, Firefox, etc. Thin client user interface 406 can use Atlas or another AJAX library, etc. for implementing some of the functionality. Server components 404 include syntax coloring 408, command completion 410, parameter help 412, web service layer 414, and development environment back-end 416. Syntax coloring 408, command completion 410, and parameter help 412 are just non-limiting examples of the types of development features provided by the server-based software development application. Web service layer refers to the functionality that allows communication to occur between development environment back-end 416 and thin client 406. Development environment back-end 416 is responsible for providing the functionality of the application, such as project context, semantic context, syntax coloring, etc.

Figure 6:
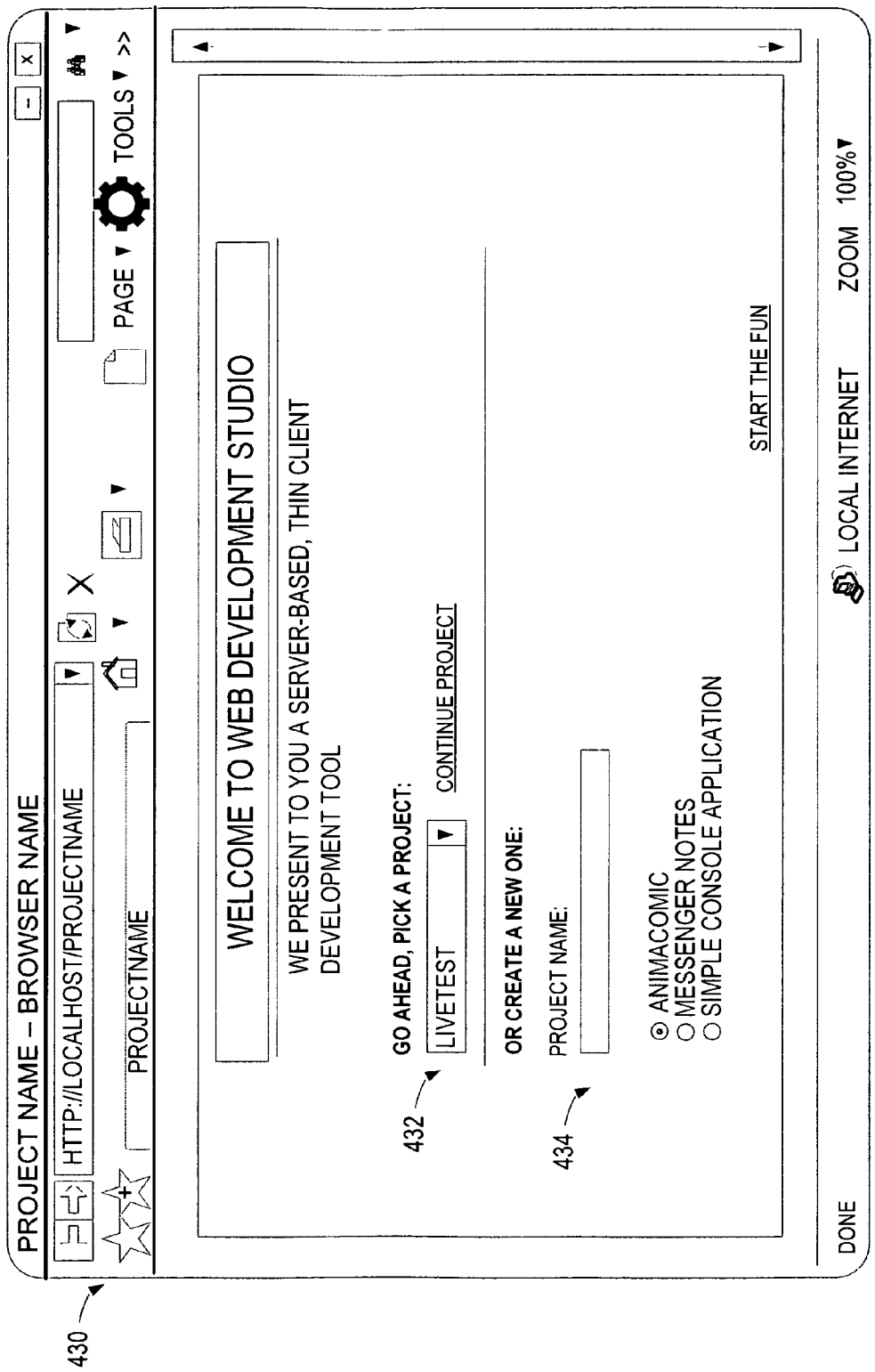
FIG. 6 is a simulated screen for one implementation of the system of FIG. 1 that illustrates a thin client user interface for the server-based software development application to allow a user to create a project or continue an existing one.
Figure 7:
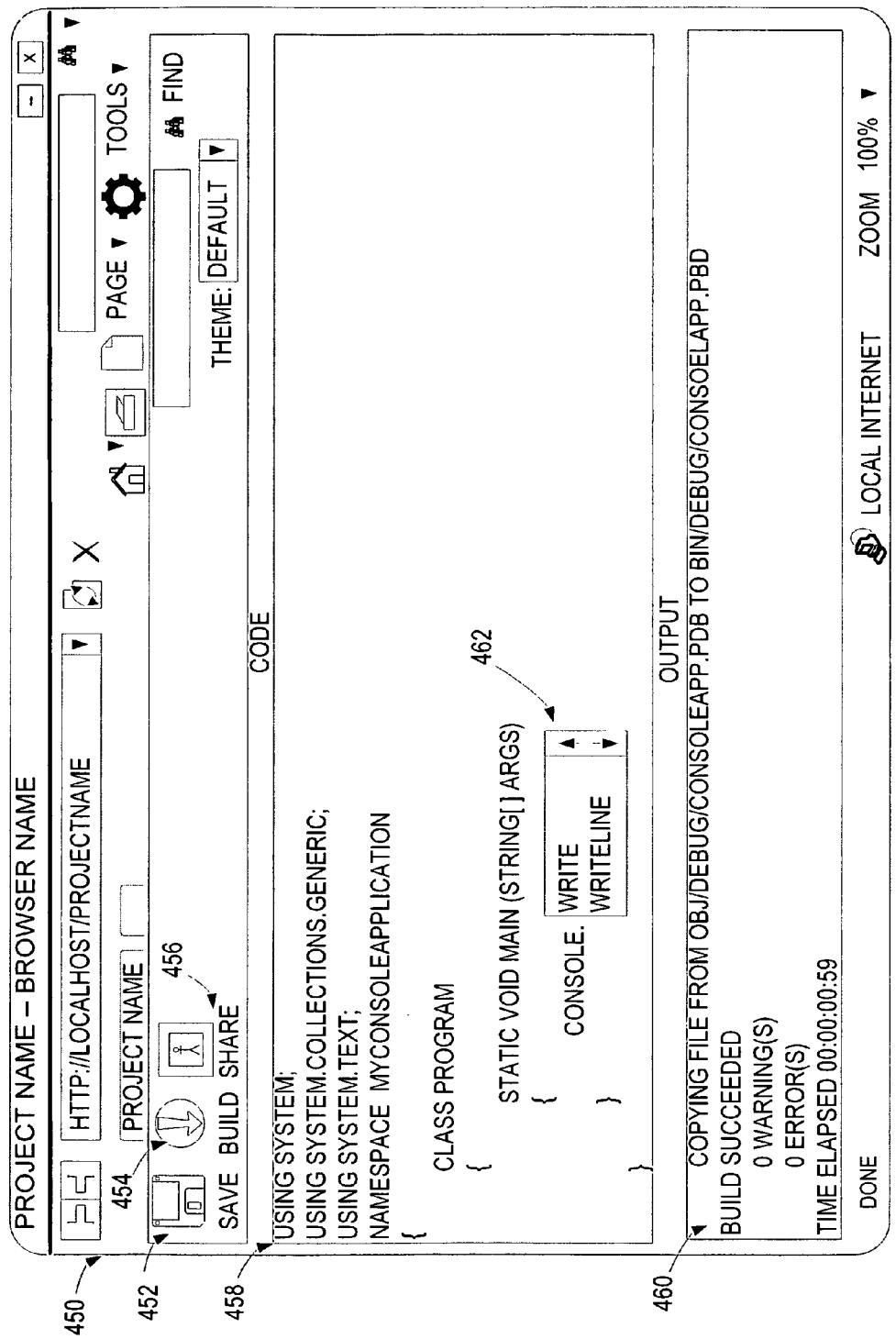
FIG. 7 is a simulated screen for one implementation of the system of FIG. 1 that illustrates a thin client user interface for the server-based software development application that allows a user to write source code, compile the source code, and see the results.

FIG. 6 is a simulated screen 430 for one implementation of the system of FIG. 1 that illustrates a thin client user interface for the server-based software development application to allow a user to create a project 434 or continue an existing one 432. FIG. 7 is a simulated screen 450 for one implementation of the system of FIG. 1 that illustrates a thin client user interface for the server-based software development application that allows a user to write source code 458, compile the source code using a build feature 452, and see the compilation results in a compilation window 460. The project can be saved using the Save option 452, and optionally shared with other users using the Share option 456. The command completion feature 462 is shown after typing the phrase "Console." to show the various options for completing the command. While not shown to preserve clarity, syntax coloring can also be used to change the color of different types of syntax to make it easy for the user to distinguish. One non-limiting example is to provide comments in a different color than actual commands. Parameter help can also be provided, such as showing the user what parameters a given procedure call accepts, in order to help the user finish writing the call to that procedure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing a thin client development environment comprising the steps of:
   providing a server-based software development application operable to be displayed in a thin client user interface on a client computer, wherein the server-based software development application is operable to provide the client computer with development features comprising command completion, syntax coloring, and parameter help;
   receiving input from the client computer to interact with a software development project using the server-based software development application, wherein the software development project comprises source code;
   receiving a compile selection from the client computer to compile the software development project using the server-based software development application;
   generating a compiled application with the server-based software development application; and
   providing the compiled application to a destination computer, wherein the destination computer is not the client computer, wherein the server-based software development application is operable to allow a user that created the software development project to specify if any of a plurality of users have one or more access rights to the software development project.

2. The method of claim 1, wherein the compiled application is provided to the destination computer by making at least one file available for download.

3. The method of claim 1, wherein the at least one file comprises an executable program.

4. The method of claim 1, further comprising receiving input from another client computer to interact with the software development project using the server-based software development application, the interaction from the another client computer comprising a revision that is stored with the software development project.

5. The method of claim 1, wherein the server-based software development application supports development for a plurality of operating system platforms.

6. The method of claim 1, wherein the software development project can be accessed by a plurality of users.

7. The method of claim 1, wherein the software development project is operable to be stored on a server computer.

8. The method of claim 1, wherein the software development project is operable to be stored on the client computer.

9. The method of claim 1, wherein the server-based software development application takes up at least one gigabyte of storage space on a server to provide a plurality of software development features.

10. The method of claim 1, wherein the server-based software development application is operable to provide the thin client user interface using at least some commands based on an Asynchronous JavaScript and XML (AJAX) technology.

11. The method of claim 1, wherein a component is downloaded from the server-based software development application to the client computer prior to receiving input from the client component before the thin client user interface will function properly.

12. A computer-readable storage medium having computer-executable instructions for causing a computer to perform the steps recited in claim 1.

13. A computer-readable storage medium having computer-executable instructions for causing a computer to perform steps comprising:
provide a server-based software development application operable to be displayed in a thin client user interface on a client computer, wherein the server-based software development application is operable to provide the client computer with development features comprising command completion, syntax coloring, and parameter help;
receive input from the client computer to interact with a software development project using the server-based software development application, wherein the software development project comprises source code;
receive a compile selection from the client computer to compile the software development project using the server-based software development application;
generate a compiled application with the server-based software development application;
provide the compiled application to a destination computer, wherein the destination computer is not the client computer, wherein the server-based software development application is operable to allow a user that created the software development project to specify if any of a plurality of users have one or more access rights to the software development project; and
share access to the software development project with another client computer.

14. The computer-readable storage medium of claim 13, wherein the compiled application is provided to the destination computer by making at least one file available for download.

15. The computer-readable storage medium of claim 13, wherein the at least one file comprises an executable program.

16. The computer-readable storage medium of claim 13, further comprising receive input from the another client computer to interact with the software development project using the server-based software development application, the interaction from the another client computer comprising a revision that is stored with the software development project.

17. A method for server-based software development project sharing comprising the steps of:
providing a server-based software development application operable to be displayed in a thin client user interface on a client computer, wherein the server-based software development application is operable to provide the client computer with development features comprising command completion, syntax coloring, and parameter help;
receiving input from the client computer to interact with a software development project using the server-based software development application, wherein the software development project comprises source code;
receiving a compile selection from the client computer to compile the software development project using the server-based software development application;
generating a compiled application with the server-based software development application;
providing the compiled application to a destination computer, wherein the destination computer is not the client computer, wherein the server-based software development application is operable to allow a user that created the software development project to specify if any of a plurality of users have one or more access rights to the software development project; and
providing the software development project to a second client computer, wherein comments are received from the second client computer regarding the software development project, and wherein the comments are stored along with the software development project.

18. The method of claim 17, wherein the first client computer and second client computer are required to provide proper login credentials before accessing the server-based software development application.

19. A computer-readable storage medium having computer-executable instructions for causing a computer to perform the steps recited in claim 17.

* * * * *